United States Patent [19]
Kirkpatrick

[11] Patent Number: 5,452,677
[45] Date of Patent: Sep. 26, 1995

[54] HULL VALVE ASSEMBLY

[75] Inventor: Ivan S. Kirkpatrick, Newport News, Va.

[73] Assignee: Newport News Shipbuilding and Dry Dock Company, Newport News, Va.

[21] Appl. No.: 140,663

[22] Filed: Oct. 21, 1993

[51] Int. Cl.⁶ .................................................. B63G 8/22
[52] U.S. Cl. .................. 114/333; 114/198; 251/315.01; 138/140
[58] Field of Search .................................. 114/182, 197, 114/198, 333; 251/315 MT, 315 HU, 368; 138/139, 140, 141

[56] References Cited

U.S. PATENT DOCUMENTS

| | | | |
|---|---|---|---|
| 648,923 | 5/1900 | Charette | 114/198 |
| 4,311,298 | 1/1982 | Carlson | 251/315 HU |
| 4,544,523 | 10/1985 | McCollough et al. | 138/140 |

*Primary Examiner*—Jesus D. Sotelo
*Attorney, Agent, or Firm*—Lalos & Keegan

[57] ABSTRACT

A hull and backup valve assembly for a submarine includes a valve body made of the same material as the hull; thus, the valve body can be welded directly to the hull. The flow path of the valve is straight and disposed at an angle relative to the surface of the hull, facilitating the removal of the valves' components for inspection and repair. Corrosion resistance is obtained through the extensive use of clad overlays and internal barriers that completely protect the steel surfaces from seawater contact. The valve stem is made of a titanium alloy and mates directly to the rack of a hydraulic actuator, thereby further reducing the parts and volume required for the valve assembly.

17 Claims, 1 Drawing Sheet

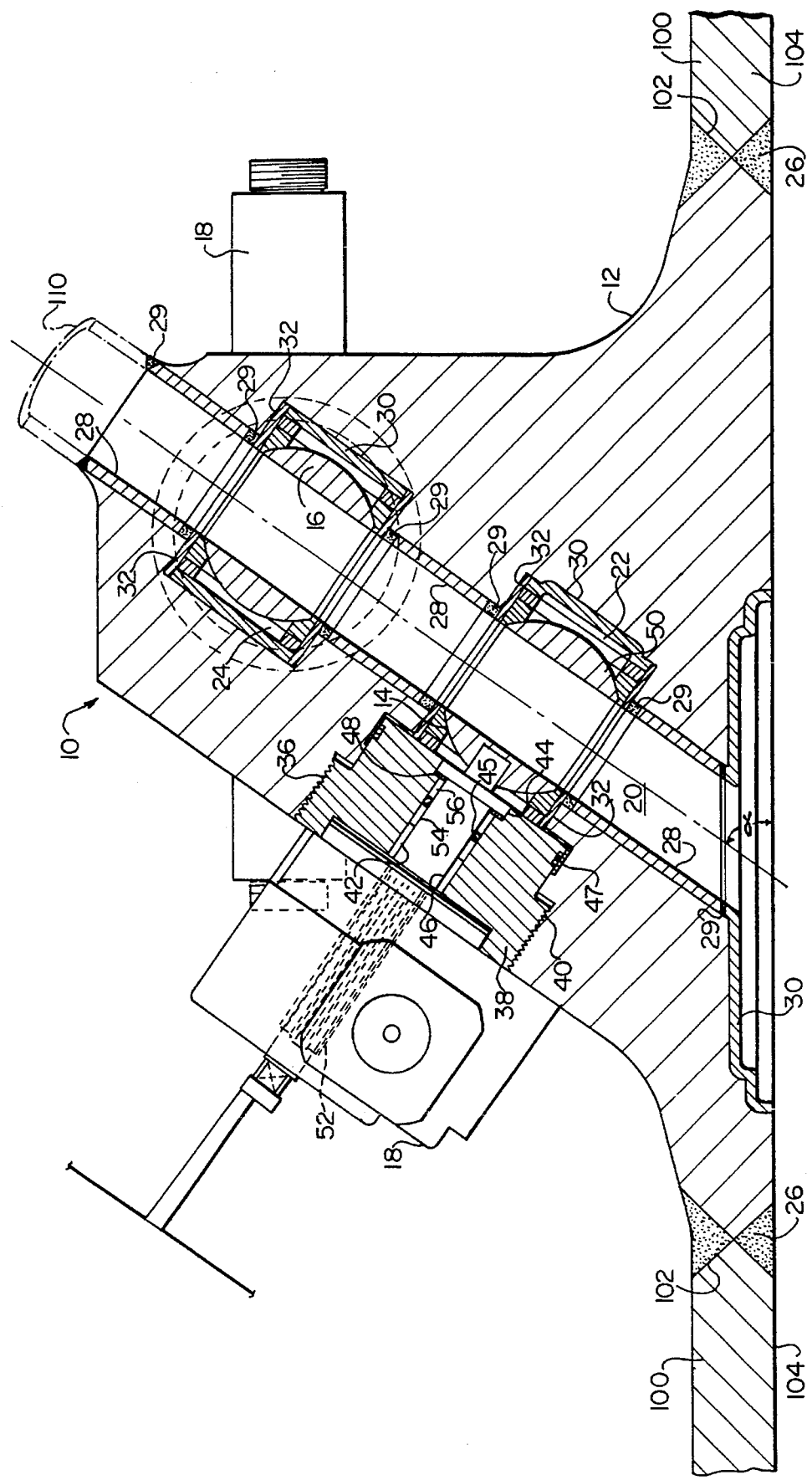

ns5,452,677

HULL VALVE ASSEMBLY

BACKGROUND OF THE INVENTION

This invention is a valve assembly located at a hull penetration of a submarine including a hull valve and a backup valve. Such a valve functions to control liquids passing through the hull of a submarine and comprises two valves in series, one serving as a backup in case the other fails. The valve assembly permits the intake and/or discharge of seawater or other fluids for use by various systems, such as the submarine's cooling system. Because the valve internals are exposed to seawater, corrosion resistance is critical.

The prior art hull and backup valves include a large hull insert made of a steel alloy welded in to the hull. The hull and backup valves are attached to the hull insert with large attachment studs and nuts. The flow path of the prior art valves extends perpendicular to the hull surface and then bends at a right angle so as to be parallel to the hull surface. Two valves are positioned in the line along either the section of the flow path parallel to the hull surface or the section of the flow path perpendicular to the hull surface. The splined valve stem is typically made of a Ni-Cu alloy sold by Inco Alloys International under the trademark K-MONEL and is connected to the actuator via a pinion gear. The bonnet is typically secured in place with cap screws or studs. The larger valves, i.e., greater than 6 inches NPS (nominal pipe size), include a welded overlay on the internal surfaces to improve corrosion resistance. In the smaller valves, however, the physical dimensions impede the welding of such an overlay.

The prior art has several disadvantages. The valves tend to be very large and heavy due to the large attachment studs and nuts required to withstand underwater explosions. The hull insert adds additional weight and decreases the available internal volume of the ship. To perform any kind of maintenance other than external inspection generally requires the valve to be removed from the hull and reworked in the shop. Removing these overly large hull and backup valves frequently requires that nearby components and piping be removed first. Since these prior art valves in the smaller sizes do not have adequate corrosion resistance in key areas, they require extensive rework and repair. Finally, little attention has been given to reducing the internal hull volume and weight of the hull and backup valve and the associated hull insert. As the hydraulic actuators of the older valves are add on components, the designs have merely incorporated the hydraulic actuators and associated equipment into the existing designs in lieu of being integrally designed with the valve. Integral actuator designs result in large volume and weight improvements.

SUMMARY OF THE INVENTION

The hull and backup valve assembly of the present invention eliminates many of the deficiencies of the prior art. Rather than a copper-nickel valve body, the valve body of the present invention is made of steel, the same material as the hull of the submarine. Thus, the valve body can be welded into the hull, eliminating the need for a heavy hull insert and the large attaching studs and nuts. The flow path of the present invention is straight and disposed at an angle relative to the surface of the hull. This arrangement occupies less internal volume and facilitates the removal of the valves' components for inspection and repair. Corrosion resistance is improved through the extensive use of clad overlays and internal barriers that completely protect the steel parts from seawater contact. The valve stem is of a titanium alloy and mates directly to the rack of the hydraulic actuator, thereby further reducing the parts and volume required for the valve assembly.

BRIEF DESCRIPTION OF THE DRAWINGS

The FIGURE is a cross-sectional view of the preferred embodiment of the present invention.

DESCRIPTION OF THE PREFERRED EMBODIMENTS

Referring to the illustration of the present invention shown in the FIGURE, the valve assembly, shown generally as 10, is positioned within an opening 102 in a hull 100 of a submarine. Valve assembly 10 includes a valve body 12, a hull valve 14, a backup valve 16 and an actuator 18 for each valve (only one of which is shown). Valve body 12 includes an internal passageway 20 disposed at an angle α relative to the surface 104 of hull 100. Valve body 12 also includes a first opening 22 for receiving valve 14 and a second opening 24 for receiving backup valve 16. As seen in the FIGURE, valve receiving openings 22 and 24 communicate with internal passageway 20 such that when valves 14 and 16 are disposed within openings 22 and 24, respectively, the valves are disposed in operative association with internal passageway 20. Also as seen in the FIGURE, it is preferred that valves 14 and 16 be disposed at approximately 90° relative to each other.

Valve body 12 is made of the same material as hull 100, for example, a steel such as HY-100, thus enabling the valve body to be welded directly to the hull via circumferential welds 26. By making the valve body 12 of steel, the strength of the valve body is improved, thereby reducing the size of the valve body, and the need for a hull insert with attaching studs and nuts. The large removal paths, required by the prior art design, are reduced considerably to only those required to remove the valve internals. Thus, the steel valve body reduces the space required by the valve and improves the space utilization of the internal volume of the submarine.

To prevent corrosion of the steel when in contact with the seawater, all internal surfaces of valve body 12 exposed to seawater are clad with a corrosion resistant material. As seen in FIG. 1, valve assembly 10 includes a cylindrical insert 28 preferably in the form of a pipe made of a material compatible with the piping system 110 which serves valve assembly 10. Insert 28 lines internal passageway 20, thereby protecting the internal passageway from exposure to seawater. Insert 28 is seal welded at 29, i.e., completely welded about the periphery thereof so as to provide a complete seal, at both ends to prevent seawater from seeping between insert 28 and internal passageway 20. Seal welding is a common process, well known in the art, and is described in Mil-Std-278F, hereby incorporated by reference.

In other areas of the internal surface of the valve body, a weld overlay 30 is provided. Overlay 30 comprises several layers (as may be required for optimum welding) of corrosion resistant copper-nickel, of a high strength, nonmagnetic nickel-chromium-iron alloy sold by Inco Alloys International under the trademark INCONEL or of similar materials. Because copper-nickel and INCONEL are incompatible with steel, it is necessary to prepare the surface of the steel by buttering before the copper-nickel or INCONEL layers are installed. Like seal welding, buttering is well known in the art and is described in Mil-Std-278F, which has been incorporated by reference. In the most corrosion prone area, the seat support surface 32, the weld is of a nickel-molybdenum-chromium alloy or similar material, such as the nickel-molybdenum-chromium alloy sold by Haynes International Inc. under the trademark HASTELLOY C-276. HASTELLOY is known to be especially resistant to pitting corrosion. It thus can be seen that all internal areas are protected from corrosion. An important design feature is the straight-through flow path which facilitates the application of the required corrosion protection features. This design facilitates the installation of inserts 28 and the weld overlays. The complete use of such extensive and effective overlays reduces the valve maintenance requirements.

To facilitate the installation and removal of the valve for inspection, each opening 22 and 24 is provided with an internally threaded portion 36. A bonnet 38 of the valve is provided with external threads 40, thereby permitting the bonnet to be screwed into and secured to the opening. This arrangement significantly reduces the number of parts required for the installation of the valve. Bonnet 38 further includes an internal opening 42 with a step portion 44. A valve stem 46 is received within opening 42. Suitable bearings 54 and 56 of nonmetallic materials prevent stem and bonnet contact. An o-ring 45 seals stem 46 to bonnet 38. Another o-ring 47 seals bonnet 38 to body 12 and isolates the bonnet/body threads from seawater. Valve stem 46 includes a radial flange 48 disposed within step portion 44. This arrangement prevents the valve stem from being forced out of the bonnet, an occurrence known as blow-out.

Both stem 46 and the valve ball 50 are made of titanium alloys that have higher strength and more corrosion resistance than the previous materials; thus, the stem is of a smaller diameter than the prior art valve stem. Stem 46 and actuator 18 include a series of matching involute splines 52 so that stem 46 mates directly with the rack of actuator 18, again reducing the number of parts and size required by the valve assembly.

Finally, in a preferred embodiment, actuator 18 may be designed as integral with the valve bonnet 38, thus eliminating the need for additional attaching hardware.

From the foregoing description, it is evident that changes, adaptations and modifications of the present invention could be made by those skilled in the art. However, all such variations should be considered as within the scope of the description, limited solely by the appended claims.

I claim:

1. A valve assembly located at the interior surface of the hull of a water vessel, the valve assembly comprising:

a valve body of the same material as said hull welded to the hull, said valve body including an internal passageway and an opening for receiving a valve, said valve receiving opening communicating with said internal passageway;

said valve disposed in said valve receiving opening being operatively associated with said internal passageway;

a corrosion resistant overlay secured to the surface of said internal passageway and at least a portion of the surface of said valve receiving opening, said corrosion resistant overlay comprising an insert made of a corrosion resistant material disposed within and welded to the ends of said internal passageway and a plurality of welded layers secured to said portion of said valve receiving opening;

means for securing said valve in said valve receiving opening; and an actuator for actuating said valve.

2. A valve assembly according to claim 1, wherein said overlay is made of a copper-nickel alloy.

3. A valve assembly according to claim 1, wherein said insert is of a copper-nickel alloy and each of said layers is of a nickel-molybdenum-chromium alloy.

4. A valve assembly according to claim 1, wherein said portion of said valve receiving opening comprises a seat support surface, said seat support surface being clad with a nickel-molybdenum-chromium alloy.

5. A valve assembly located at the interior surface of the hull of a submarine comprising:

a valve body secured to the hull, said valve body including an internal passageway and an opening therein for receiving a valve, said valve receiving opening communicating with said internal passageway;

a valve disposed in said valve receiving opening being operatively associated with said internal passageway, said valve including a valve stem made of a titanium alloy;

a bonnet for securing said valve in said valve receiving opening;

an actuator integral with said bonnet for actuating said valve; and means for registering said actuator with said valve stem.

6. A valve assembly according to claim 5, wherein said registering means comprises matching splines between said actuator and said valve stem.

7. A valve assembly according to claim 5, wherein the valve comprises a ball, the ball being made of a titanium alloy.

8. A valve assembly located at the interior surface of the hull of a submarine comprising:

a valve body secured to the hull, said valve body including an internal passageway and an opening for receiving a valve, said internal passageway being straight over its entire length and disposed at an acute angle relative to said hull surface, said valve receiving opening communicating with said internal passageway;

said valve disposed in said valve receiving opening being operatively associated with said internal passageway;

means for securing said valve in said valve receiving opening;

an actuator for actuating said valve; and further comprising a second valve receiving opening disposed in said valve body and communicating with said internal passageway for receiving a second valve, said second valve being in operative association with said internal passageway, and a second means for securing said second valve in said second valve receiving opening.

9. A valve assembly according to claim 8, wherein the axes of both said first and second valve receiving openings are perpendicular to said internal passageway and said first valve receiving opening is disposed approximately 90° relative to said second valve receiving opening.

10. A valve assembly located at the interior surface of the hull of a submarine comprising:

a valve body secured to the hull, said valve body including an internal passageway and an opening for receiving a valve, said internal passageway being straight over its entire length and disposed at an acute angle relative to said hull surface, said valve receiving opening communicating with said internal passageway;

said valve disposed in said valve receiving opening being operatively associated with said internal passageway;

means for securing said valve in said valve receiving opening;

an actuator for actuating said valve; and further comprising a corrosion resistant overlay secured to the internal surface of said valve body and at least a portion of the surface of said valve receiving opening, said overlay comprising a plurality of welded layers.

11. A valve assembly located at the interior surface of the hull of a submarine comprising:

a valve body secured to the hull, said valve body including an internal passageway and an opening for receiving a valve, said internal passageway being straight over its entire length and disposed at an acute angle relative to said hull surface, said valve receiving opening communicating with said internal passageway;

said valve disposed in said valve receiving opening being operatively associated with said internal passageway;

means for securing said valve in said valve receiving opening;

an actuator for actuating said valve; and further comprising an insert made of a corrosion resistant material disposed within and sealed to said internal passageway at both ends thereof.

12. A valve assembly located at the interior surface of the hull of a submarine comprising:

a valve body secured to the hull, said valve body including an internal passageway and an opening for receiving a valve, said internal passageway being straight over its entire length and disposed at an acute angle relative to said hull surface, said valve receiving opening communicating with said internal passageway;

said valve disposed in said valve receiving opening being operatively associated with said internal passageway;

means for securing said valve in said valve receiving opening;

an actuator for actuating said valve; and further comprising a corrosion resistant overlay secured to at least a portion of the surface of said internal passageway, said overlay comprising a plurality of welded layers.

13. A valve assembly according to claim 12, wherein said overlay is a copper-nickel alloy.

14. A valve assembly according to claim 12, wherein said overlay is a nickel-chromium-iron alloy.

15. A valve assembly located at the interior surface of the hull of a submarine comprising:

a valve body secured to the hull, said valve body including an internal passageway and an opening for receiving a valve, said internal passageway being straight over its entire length and disposed at an acute angle relative to said hull surface, said valve receiving opening communicating with said internal passageway;

said valve disposed in said valve receiving opening being operatively associated with said internal passageway;

means for securing said valve in said valve receiving opening;

an actuator for actuating said valve; and further comprising a corrosion resistant overlay secured to at least a portion of said valve receiving opening, said overlay comprising a plurality of welded layers.

16. A valve assembly according to claim 15, wherein said overlay is made of a nickel-molybdenum-chromium alloy.

17. A valve assembly located at the interior surface of the hull of a submarine comprising:

a valve body secured to the hull, said valve body including an internal passageway and an opening for receiving a valve, said internal passageway being straight over its entire length and disposed at an acute angle relative to said hull surface, said valve receiving opening communicating with said internal passageway;

said valve disposed in said valve receiving opening being operatively associated with said internal passageway;

means for securing said valve in said valve receiving opening;

an actuator for actuating said valve; and further comprising a corrosion resistant overlay secured to at least a seat support surface of said valve receiving opening, said overlay comprising a plurality of welded layers.

* * * * *